Figure 1:
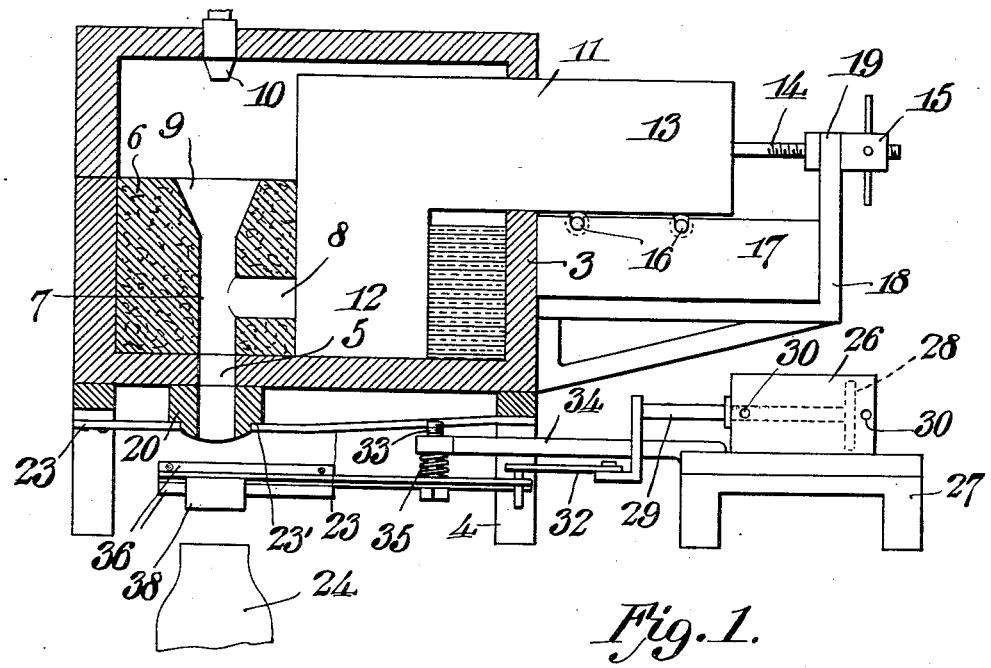

J. W. HARDING.
GLASS RUNNING-OUT DEVICE.
APPLICATION FILED DEC. 1, 1913.

1,150,030.

Patented Aug. 17, 1915.
2 SHEETS—SHEET 1.

Witnesses

Inventor
John W. Harding.
By Joshua R. H. Potts
Attorney

J. W. HARDING.
GLASS RUNNING-OUT DEVICE.
APPLICATION FILED DEC. 1, 1913.

1,150,030.

Patented Aug. 17, 1915.
2 SHEETS—SHEET 2.

Witnesses

Inventor
John W. Harding.
By Joshua R H Potts
Attorney

UNITED STATES PATENT OFFICE.

JOHN WILLIAM HARDING, OF BROCKWAYVILLE, PENNSYLVANIA, ASSIGNOR TO BROCKWAY MACHINE BOTTLE COMPANY, OF BROCKWAYVILLE, PENNSYLVANIA, A CORPORATION OF NEW YORK.

GLASS-RUNNING-OUT DEVICE.

1,150,030. Specification of Letters Patent. Patented Aug. 17, 1915.

Application filed December 1, 1913. Serial No. 803,913.

*To all whom it may concern:*

Be it known that I, JOHN W. HARDING, a citizen of the United States, residing at Brockwayville, county of Jefferson, and State of Pennsylvania, have invented certain new and useful Improvements in Glass-Running-Out Devices, of which the following is a specification.

This invention relates to glass drawing apparatus, and has for its primary object to provide means whereby molten glass may be delivered directly from the furnace to the molds without the use of ladels or other manually operated instruments.

A further object of my invention is to provide glass drawing means of such construction that in the event of any of the parts thereof becoming worn, damaged or burnt out, the same may be replaced quickly and easily and at comparatively low cost.

A still further object of my invention is to provide means for delivering molten glass directly from the furnace to the mold further characterized by means for preventing the glass from becoming cooled or chilled until the glass has been actually delivered to the mold; the construction being such as to keep the glass discharge opening free from frozen or chilled glass.

A still further object of my invention is to provide a device as thus briefly characterized, provided with improved means for controlling the flow of molten glass to the discharge port or opening.

A still further object of my invention is to provide means whereby when molten glass has been delivered to the mold, the string of glass is severed in such manner as to prevent the same being deflected from the mold opening.

A still further object of my invention is to provide in a glass furnace provided with a gathering pool and discharge openings, an improved nozzle, whereby the flow of glass therefrom is controlled to better center the same in relation to the mold.

With these objects in view, together with others which will appear as the description proceeds, my invention resides in a gathering pool or chamber in direct communication with molten glass within a furnace, flame jets adjacent and operating upon the glass in the said chamber, a discharge opening at one end of the chamber positioned preferably in vertical alinement above the molds, means within the said chamber for controlling the flow of glass to the discharge opening or outlet, and a pair of shears positioned with their cutting edges between the discharge opening and the mold in order that the glass may be severed from the chamber when a sufficient quantity has been delivered to the mold.

My invention further consists in a device as thus briefly described wherein the several parts which form collectively the complete device may be quickly and easily separated in order that, in the event of breakage, or wearing or burning out of any of the parts, the same may be readily replaced at a comparatively low cost.

My invention still further consists in the arrangement of an improved discharge nozzle in communication with the discharge opening or outlet, wherein the flowing glass may be delivered to the mold without danger of the same becoming deflected or spilled upon the edges of the mold.

My invention still further consists in the arrangement of a pair of automatically cooling vertically adjustable shears between the discharge opening and the mold, the arrangement being such as to govern the shape of the glass delivered to the mold.

My invention still further consists in the novel arrangement and combination of parts, all as will be more fully described hereinafter, and more particularly referred to in the appended claims.

Figure 2:
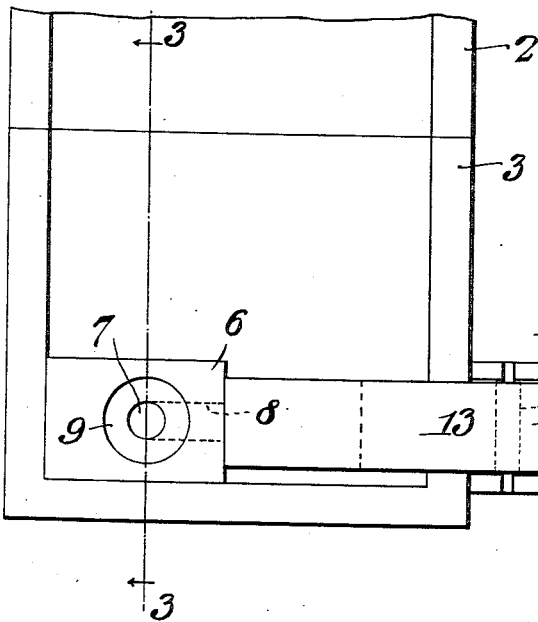
Figure 3:
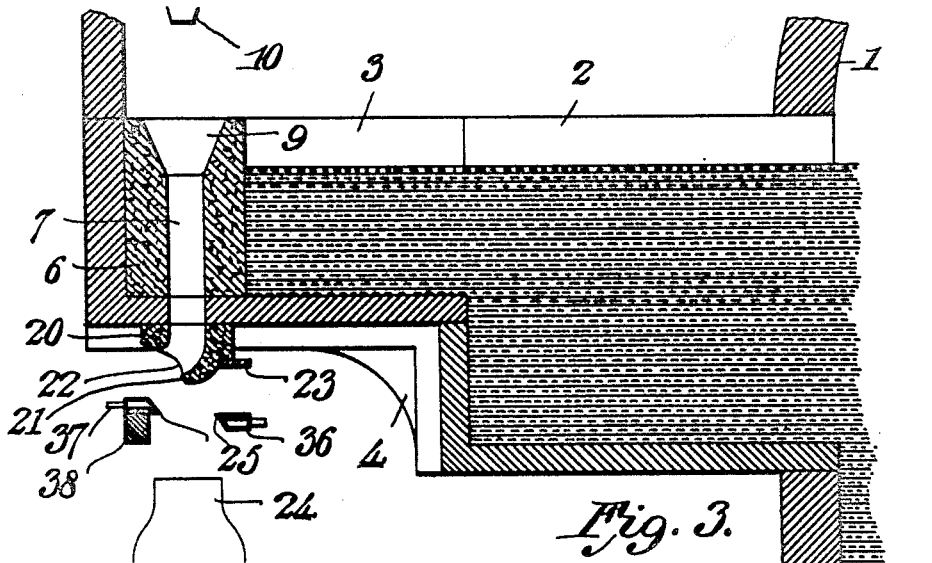
Figure 4:
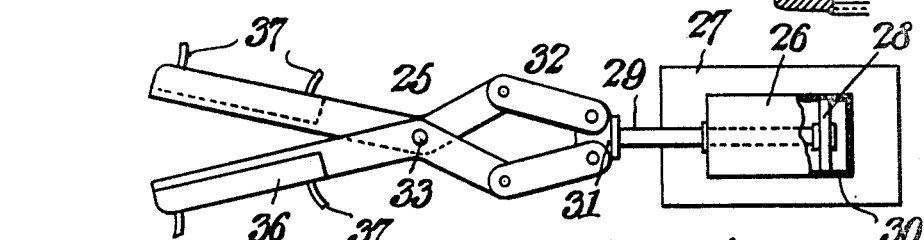
Figure 5:
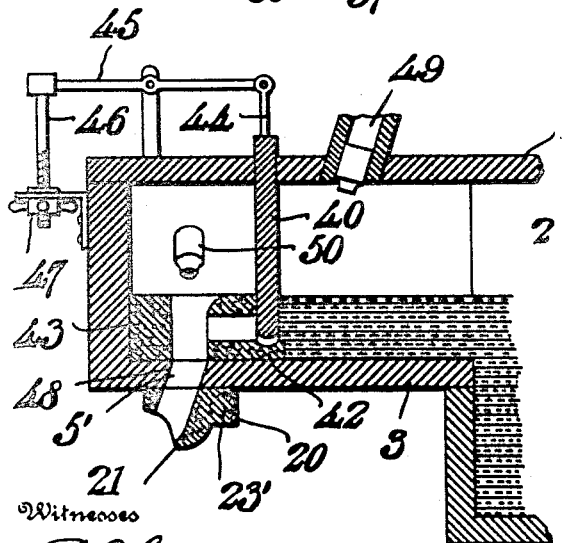

In the drawings forming a part of this specification, Figure 1 represents a front view of a glass delivering or drawing apparatus constructed in accordance with my invention, parts of the glass containing chamber being shown in section, Fig. 2 is a top plan view of the device illustrated in Fig. 1, Fig. 3 is a longitudinal section taken substantially upon the line 3—3 of Fig. 2, Fig. 4 is a plan view of the improved glass cutting shears employed in carrying out my invention; and Fig. 5 is a fragmentary section of a portion of a glass containing chamber showing a slightly modified form of the device.

Referring now more particularly to the drawing 1 represents generally a glass furnace, which may be of any approved design, and which is provided with a gathering pool or receptacle 2, extending from the side of the furnace wall, and which is adapted to contain molten glass from the furnace. Detachably secured to the outer end of the gathering pool or chamber 2, and communicating therewith, is a chamber portion 3. This chamber portion may be secured to the gathering pool in any preferred manner, in the present instance however, a pair of brackets 4 are provided, secured to a portion of the gathering pool, and upon which is adapted to rest the chamber portion 3. In order that the molten glass within the chamber may be delivered therefrom, a port or orifice 5 is provided preferably within the bottom of the chamber portion 3 and preferably adjacent the outer end thereof. A block 6, formed preferably of clay or other heat resisting material, and provided with a vertically disposed opening 7, is positioned within the chamber portion 3 with the said opening 7 in register with the opening 5 in the bottom of the chamber. A laterally disposed opening 8 is provided in the block 6 establishing communication between the glass containing chamber and the opening 7, while the opening 7 adjacent its upper end is flared as at 9 in order to receive a flame jet 10. To control the flow of molten glass through the laterally disposed opening 8, a gate 11 is provided, which is constructed to form a foot 12, adapted when in contact with the walls of the block 6 to exclude molten glass from the opening 8, and is provided with an outwardly extending body portion 13, provided with a threaded stem 14 for the reception of an internally threaded adjusting wheel 15 in order that the gate may be moved into and out of engagement with the wall of the block 6. The outer end of the body portion 13, in order to reduce friction, is mounted upon rollers 16 mounted in a suitable supporting block 17 upon a bracket 18; the said bracket 18 being provided with a vertical extension 19 through which the threaded extremity 14 of the gate is projected, and which coöperates with the adjusting wheel 15 to control the movement of the gate. Coöperating with the port or orifice 5 in the bottom of the glass containing chamber, is a nozzle 20. This nozzle may be constructed of any desired material, clay being found in general practice to be extremely efficient for the purposes, and is arranged as is shown clearly in Fig. 3 to provide a lip 21 extending into the passage assumed by the flowing glass. As shown in the present instance this is accomplished by providing the nozzle with an arcuate port, and the lowermost walls of the port being substantially longer than the remaining portion, in order that a spout shaped mouth 22 will be formed. This nozzle is detachable from the bottom of the chamber, and may be secured thereto in any preferred manner, brackets 23 being employed in the present instance, to engage shoulders 23' thereon.

In order that the primary object of my invention may be successfully attained, that is, the delivery of molten glass direct from the furnace to the mold without the employment of ladels or other manually operated instruments, the mold illustrated conventionally at 24 is arranged beneath the glass containing chamber and in direct vertical alinement with the outlet or discharge opening therein. It will be obvious from this construction that upon opening the gate 11, glass will be permitted to flow to the mold through the ports 8, 7, and the nozzle 20. In the downward movement of the glass through the opening 7, the lip 21 which extends, as is illustrated, into the path of the downwardly flowing metal, will obstruct and detain the molten mass sufficiently to deliver to the mold a stream of uniform volume. Thus it will be seen that there will be no difficulty experienced when it is necessary to direct the stream into molds having comparatively small orifices. By the provision of the flame jet in the flared end of the opening 7, the glass flowing from the chamber will be kept in fluent condition, and prevented from becoming stiff or chilled. Also when the valve gate 11 is closed to exclude the molten mass, the passage 7, as well as the mouth 22 of the nozzle, will be kept free from the accumulation of glass.

In order that the string of glass flowing to the mold may be severed to permit of the blowing process, shears 25 are provided, with the cutting edges thereof so positioned as to lie in the path of the descending stream of glass. It is preferred that the cutting device be actuated mechanically, and to this end an air tank 26 is provided, mounted upon a suitable support 27, and is provided with a piston 28, to which is secured the usual piston rod 29. Ports 30 are provided in the opposite ends of the cylinder in order that air or steam, which ever is employed, may be admitted to operate the piston. The end of the piston rod 29 is provided with a bracket 31, to which is connected, through the toggle arrangement 32, the rear end of the shear blades forming the cutting element. In order that vertical adjustment of the shears relative to the mold 24 and nozzle 20, may be made, the pivot 33 of the shear blades is extended and threaded into a bracket 34 secured to the support 27, a coil spring 35 being interposed between the bracket 34 and the shear blades in order that the latter may at all times be held into frictional engagement with each other. Each of the shear blades is provided with a water jacket 36 in order that the same may be kept in substantially cooled condition in spite of the intense heat incident to the cutting operation, and water may be supplied and exhausted from these jackets by the ducts 37. A lug 38 is provided upon one of the shear blades to prevent the end of the cut string of glass from becoming deflected to fall outside of, or upon the edges of the mold, and obviously the location of such lug would be upon the under surface of one of the shear blades and at such longitudinal point thereon as to be in vertical alinement with the downward flow of the molten glass. From the description it will be obvious that when glass has flowed from the outlet in sufficient quantity to be used in the mold, the operation of the shears is brought about to sever the stream. By the adjustment of the shears vertically with relation to the nozzle 20, it will be obvious that the glass flowing from the nozzle may be allowed to assume different shapes, that is, when the shears are adjusted close to the lip of the nozzle, the shears in cutting the glass therefrom allow the same to assume the shape of a ball in dropping into the mold. When the shears are in lower position the glass will be permitted to string out, the advantage of which will be apparent as when used in connection with a narrow necked mold. This arrangement obviously eliminates the use of a funnel heretofore employed in introducing glass to the interior of molds provided with narrow necks.

In Fig. 5 of the drawing is illustrated a slightly modified form of the device. In this form there is shown the gathering pool or receptacle 2, and the chamber portion 3, both as illustrated in the preferred form, provided in this instance with a cover 39. In order that the gate may be operated through the cover to control the flow of molten glass to the outlet, it is obvious that an arrangement must be provided different from that illustrated in the above described form, and to this end a vertically adjustable gate 40 is arranged to slide through an opening in the cover 39, and which is adapted to seat as at 42 upon an outwardly extending seat portion of the block 43, the block 43, it might be here stated, is adapted to be used in the same capacity as the block 8 in the preferred form. The upper or outwardly extending end of the gate 40, is provided with a rod or bar 44, to the outer extremity of which is pivotally connected a pivoted link 45, being in connection at its opposite end with a threaded bar and hand wheel 46 and 47 respectively for controlling the movements of the gate 40. In this form there is also illustrated a slightly modified form of outlet, in which the opening 5' in the bottom of the receptacle is angularly disposed in order that the glass in its downward movement will be prevented from adhering to the wall 48, and thereby prevent stringing or dripping of the glass upon passing from the nozzle. Flame jets 49 and 50 are provided in the cover 39 and adjacent the outlet respectively, in order that the glass will at all times be in a thoroughly fluent condition.

I claim:

1. A furnace for molten glass, a chamber at one side of and communicating with said furnace, an outlet in said chamber, a flame jet directed into said outlet, a gate mounted upon rollers and operable by a hand wheel coöperating to open and close one end of said outlet, a nozzle provided with an angularly disposed bore detachably secured adjacent the opposite end of and communicating with said outlet, a pair of water jacketed adjustable shears beneath said nozzle, and means for operating said shears, substantially as described.

2. A furnace for molten glass, a chamber at one side of and communicating with said furnace, an outlet in the bottom of said chamber, a nozzle secured adjacent and communicating with said outlet, said nozzle having an angularly disposed bore and a lip formed at the mouth of said nozzle and extending partly across said bore, a pair of shears beneath said nozzle, and means for admitting molten glass to said chamber, substantially as described.

3. A furnace for molten glass, a chamber communicating with said furnace, said chamber having its bottom provided with an outlet, a nozzle communicating with said outlet and having a lip extending part way across the mouth thereof; in combination with a pair of shears located beneath said nozzle, said shears being capable of vertical adjustment, and means for operating said shears, substantially as described.

4. A furnace for molten glass, a chamber communicating with said furnace, said chamber having a bottom provided with an outlet, a nozzle communicating with said outlet, said nozzle being provided with a lip extending partly across the mouth thereof, and means for controlling the flow of glass to said outlet, substantially as described.

5. A furnace for molten glass, a chamber communicating with said furnace provided in its bottom with an angularly disposed outlet, a nozzle provided with an angularly disposed bore adapted to be secured adjacent said chamber with said bore in communication with said outlet, said nozzle being provided with a lip extending partly across the mouth thereof, and means for controlling the flow of glass to said outlet, substantially as described.

6. In a device of the class described, a furnace for molten glass, an outlet in the bottom of said furnace, a nozzle secured to communicate with said outlet, a lip extending partly across the mouth of said nozzle to deflect the flow of glass therefrom, a mold beneath said nozzle having its opening in vertical alinement with the mouth thereof, and means for controlling the flow of glass to said nozzle, substantially as described.

In testimony whereof I have signed my name to this specification in the presence of two subscribing witnesses.

JOHN WILLIAM HARDING.

Witnesses:
H. B. McCullough,
Gertrude Cowan.